(12) United States Patent
Kim et al.

(10) Patent No.: US 11,135,108 B2
(45) Date of Patent: Oct. 5, 2021

(54) RAMP APPARATUS OF DOOR FOR VEHICLE

(71) Applicants: Hyundai Motor Company, Seoul (KR); Kia Motors Corporation, Seoul (KR)

(72) Inventors: Min Han Kim, Gunpo-si (KR); Jae Yong Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/861,962

(22) Filed: Apr. 29, 2020

(65) Prior Publication Data

US 2021/0161737 A1 Jun. 3, 2021

(30) Foreign Application Priority Data

Dec. 2, 2019 (KR) .......................... 10-2019-0158561

(51) Int. Cl.
*A61G 3/06* (2006.01)
*B60P 1/43* (2006.01)

(52) U.S. Cl.
CPC ................ *A61G 3/061* (2013.01); *B60P 1/43* (2013.01)

(58) Field of Classification Search
CPC .......... A61G 3/061; A61G 3/067; B60P 1/43; B60P 1/431; B60P 1/435; B65G 69/30; B65G 69/28; B65G 69/2811; B65G 69/2823

USPC ......................................................... 414/537
See application file for complete search history.

(56) References Cited

U.S. PATENT DOCUMENTS

| | | | |
|---|---|---|---|
| 6,241,452 B1 * | 6/2001 | Eekhoff .................... | B60P 1/43 14/71.1 |
| 6,293,748 B1 * | 9/2001 | Savaria ..................... | B60P 1/43 14/69.5 |
| 7,104,524 B1 | 9/2006 | Hidding et al. | |
| D674,162 S * | 1/2013 | Gooch .......................... | D34/32 |
| 8,511,734 B2 * | 8/2013 | Hutchins, Jr. ...... | B62D 33/0273 296/61 |
| 9,199,569 B2 * | 12/2015 | Justak ..................... | B65G 69/30 |
| 9,902,306 B1 * | 2/2018 | Foss .................... | B62D 33/0273 |
| 2009/0255067 A1 * | 10/2009 | Budd ...................... | A61G 3/061 14/71.1 |
| 2016/0144759 A1 * | 5/2016 | DiBlasio .............. | B62D 33/023 414/537 |
| 2020/0324831 A1 * | 10/2020 | DeSimone ............ | B62D 27/06 |

* cited by examiner

*Primary Examiner* — Glenn F Myers
(74) *Attorney, Agent, or Firm* — Slater Matsil, LLP

(57) ABSTRACT

A ramp apparatus of a door for a vehicle is provided. The ramp apparatus includes a door configured to open and close an interior of a vehicle, the door having an interior space, a guide unit installed in the interior space of the door, wherein the guide unit is configured to be slid to be extracted to an outside of the door or to be inserted into the door, and a ramp mechanism installed in the guide unit, wherein the ramp mechanism is configured to be rotatable, the ramp mechanism comprising a plurality of ramp panels connected to each other and rotatable with respect to each other, wherein the ramp panels are configured to be folded when being located in the interior of the door and to be unfolded when being extracted to the outside of the door by the guide unit.

20 Claims, 10 Drawing Sheets

RAMP APPARATUS OF DOOR FOR VEHICLE

CROSS-REFERENCE TO RELATED APPLICATIONS

This application claims priority to Korean Patent Application No. 10-2019-0158561, filed in the Korean Intellectual Property Office on Dec. 2, 2019, which application is hereby incorporated herein by reference.

TECHNICAL FIELD

The present disclosure relates to a ramp apparatus of a door for a vehicle.

BACKGROUND

In recent years, a ramp structure for mounting of a wheelchair or an electric vehicle of a small size in addition to boarding of a passenger and loading of cargo in the interior of a vehicle has been applied.

The ramp structure is widely utilized in a vehicle structure in which a door is slid to be opened and closed, and a separate ramp panel is provided and used for mounting a wheelchair or a mini-electric vehicle in the interior of a vehicle.

That is, the ramp structure may be classified into a form in which the ramp structure is received in a floor, a form in which the ramp structure is kept in a trunk in a separate reception form, and a form in which the ramp structure is held in a cabin room entrance space, and because the ramp structure is not used except for when a wheelchair or a mini-electric vehicle boards/unboards the vehicle, it occupies an unnecessary space. Further, because most of the conventional ramp structure is exposed to the outside, the boarding/unboarding of a passenger is disadvantageous and it may intrude into a residential space or is aesthetically disadvantageous. Further, when a separate ramp panel is constituted, the ramp panel should be attached and detached every time, which is troublesome.

Accordingly, a method of receiving the ramp structure at a lower end of a floor of a vehicle is applied, but the height of the vehicle becomes lower and the height of the floor becomes higher whereby the space for a battery may become smaller when the method is applied to an electric vehicle and may influence a travel distance or the like.

The items described as the background technologies are provided only for improvement of understanding of the background of the present disclosure, and it should not be understood as admitting that the items that correspond to the conventional technology are known to those skilled in the art to which the present disclosure pertains.

SUMMARY

The present disclosure relates to a ramp apparatus of a door for a vehicle. Particular embodiments relate to a ramp apparatus of a door for a vehicle that provides an inclined route when a wheelchair or a mini-electric vehicle boards a vehicle.

Embodiments of the present disclosure provide a ramp apparatus of a door for a vehicle that secures an interior space for a vehicle by applying a ramp structure to a door of the vehicle and is not exposed to the outside of the vehicle.

According to an embodiment of the present disclosure, a ramp apparatus of a door for a vehicle may include a door configured to open and close an interior of the vehicle and having an interior space, a guide unit installed in the interior space of the door to be slid to be extracted to the outside of the door or inserted into the door, and a ramp mechanism installed in the guide unit to be rotatable and including a plurality of ramp panels connected to each other such that the plurality of ramp panels are rotatable with respect to each other, the plurality of ramp panels being configured to be folded when being located in the interior of the door and to be unfolded when being extracted to the outside of the door by the guide unit to be seated on the ground surface so as to define an inclined route.

The door may be configured to be slid in the vehicle to open and close the interior of the vehicle and the interior space is formed to pass through a closing direction of the door, and when the door is located to open the interior of the vehicle, the ramp mechanism may be extracted in the closing direction of the door through the guide unit.

The ramp mechanism may include a plurality of ramp panels, any one of which is installed in the guide unit to be rotatable and the remaining ones of which are connected to each other to be rotatable with respect to each other such that an inclined route is defined as the remaining ones of the plurality of ramp panels are unfolded to the outside of the vehicle when being extracted to the outside of the door, and an extension panel installed in the guide unit to be rotatable and configured to be rotated to the interior of the vehicle when being extracted to the outside of the door to define an inclined route together with the ramp panels.

The plurality of ramp panels may include a first ramp panel installed in the guide unit to be rotatable upwards and downwards, and a second ramp panel connected to the first ramp panel to be rotatable upwards and downwards, and the first ramp panel may be rotated downwards when being extracted to the outside of the door and the second ramp panel is rotated upwards from the first ramp panel to be unfolded.

The ramp mechanism may further include a support link connected to the first ramp panel and the second ramp panel to be rotatable, respectively, and configured such that the first ramp panel and the second ramp panel are horizontal when the first ramp panel and the second ramp panel are rotated to be unfolded.

A third ramp panel connected to the second ramp panel to be rotatable upwards and downwards and configured to be seated on the ground surface when being extracted to the outside of the door may be further provided.

A fourth ramp panel connected to the third ramp panel to be rotated horizontally may be further provided, and an elastic body of an elastic material may be provided at a distal end of the fourth ramp panel.

A vibration absorbing part including a material that is capable of absorbing vibration may be provided in each of the ramp panels and the extension panel such that the vibration absorbing parts contact the ramp panels and the extension panel when the ramp panels and the extension panel are folded as the ramp mechanism is located in the interior of the door.

The extension panel may be formed to extend to be seated on a floor of the vehicle when being rotated to the interior of the vehicle.

The ramp mechanism may further include a support leg installed in the guide unit to be rotatable and configured to be rotated to the lower side of the door when being extracted to the outside of the door to contact the floor of the vehicle or the ground surface so as to support the ramp mechanism.

The ramp mechanism may include a plurality of ramp panels installed in the guide unit to be rotatable, an extension panel, and a support leg, and the plurality of ramp panels, the extension panels, and the support legs may be pivoted to be rotated with respect to one hinge pin in the guide unit.

The guide unit may include a lower guide provided on the lower side of the interior space of the door and to which a specific ramp panel of the ramp mechanism is connected to be rotatable, and an upper guide provided on the upper side of the interior space of the door and connected to the ramp mechanism to be detachable.

The lower guide may include a lower roller installed on the lower side of the interior space of the door, and a lower rail extracted from and inserted into the interior space of the door over the lower roller and in which a specific ramp panel of the ramp mechanism is installed to be rotatable.

A lower striker located to face an extraction direction of the ramp mechanism may be provided in a body of the vehicle, and a lower latch configured to be selectively mounted on or separated from the lower striker when the ramp mechanism is extracted may be provided in the lower rail.

The lower latch may be configured to be rotatable horizontally and may be rotated in correspondence to an extraction or insertion direction of the ramp mechanism.

The upper guide may include an upper rail installed on the upper side of the interior space of the door, a slider configured to be slid along the upper rail, and a fixing mechanism installed in the slider and selectively connected to or separated from the ramp mechanism.

The fixing mechanism may be installed to be rotatable upwards and downwards from the slider and is formed to be stopped by the ramp mechanism such that the ramp mechanism is connected to the fixing mechanism to be stopped when the fixing mechanism is rotated downwards to restrict rotation of the ramp mechanism and is separated from the ramp mechanism when the fixing mechanism is rotated upwards to allow rotation of the ramp mechanism.

The fixing mechanism may include an upper latch that is selectively connected or separated, and an upper striker configured to be locked by the upper latch to be fixed in a state in which the upper striker is extracted to the outside of the door may be provided in the ramp mechanism.

According to the ramp apparatus of a door for a vehicle including the above-described structure, because the ramp mechanism is embedded in the door, the ramp mechanism is prevented from being exposed to the outside of the vehicle, and thus an interior space of the vehicle is secured and an external design of the vehicle is maintained. Further, according to the ramp mechanism, because the inclined route is defined as the ramp mechanism is unfolded after being extracted from the door of the vehicle, convenience of use thereof is improved, the inclined route is prevented from shaking due to the robust support structure, and the durability thereof is improved.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF ILLUSTRATIVE EMBODIMENTS

Hereinafter, a ramp apparatus of a door for a vehicle according to preferred embodiments of the present disclosure will be described with reference to the accompanying drawings.

Figure 1:
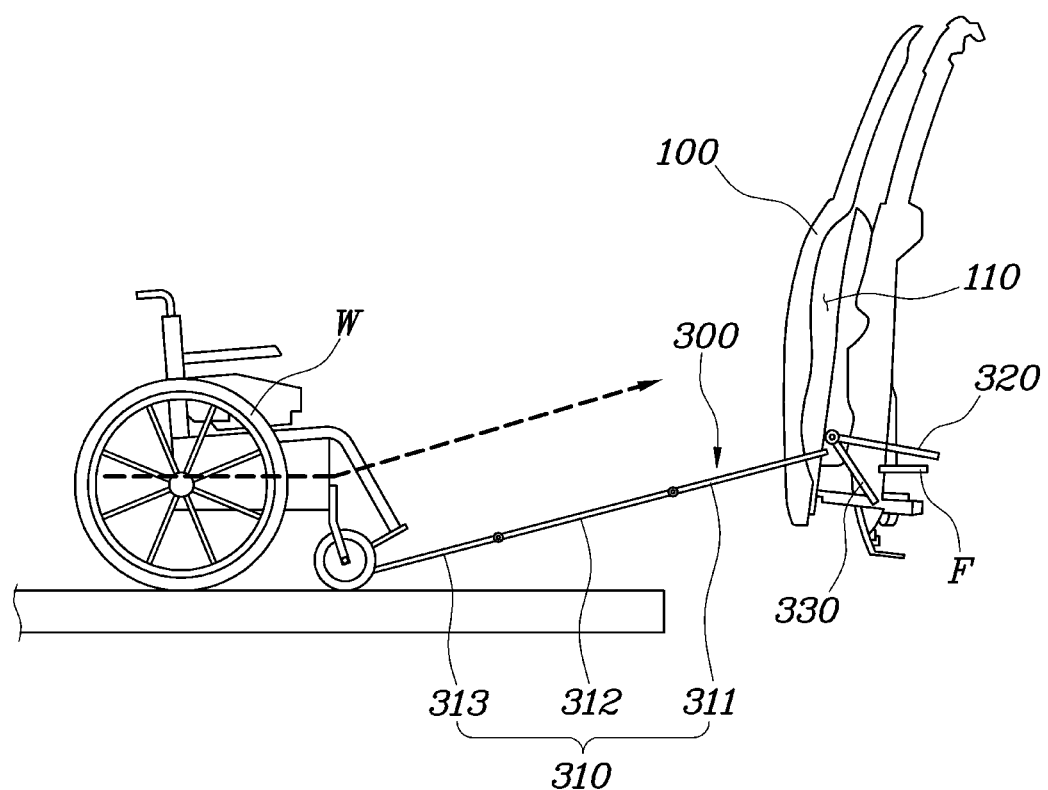
FIGS. 1 to 3 are views illustrating a ramp apparatus of a door for a vehicle according to embodiments of the present disclosure.
Figure 2:
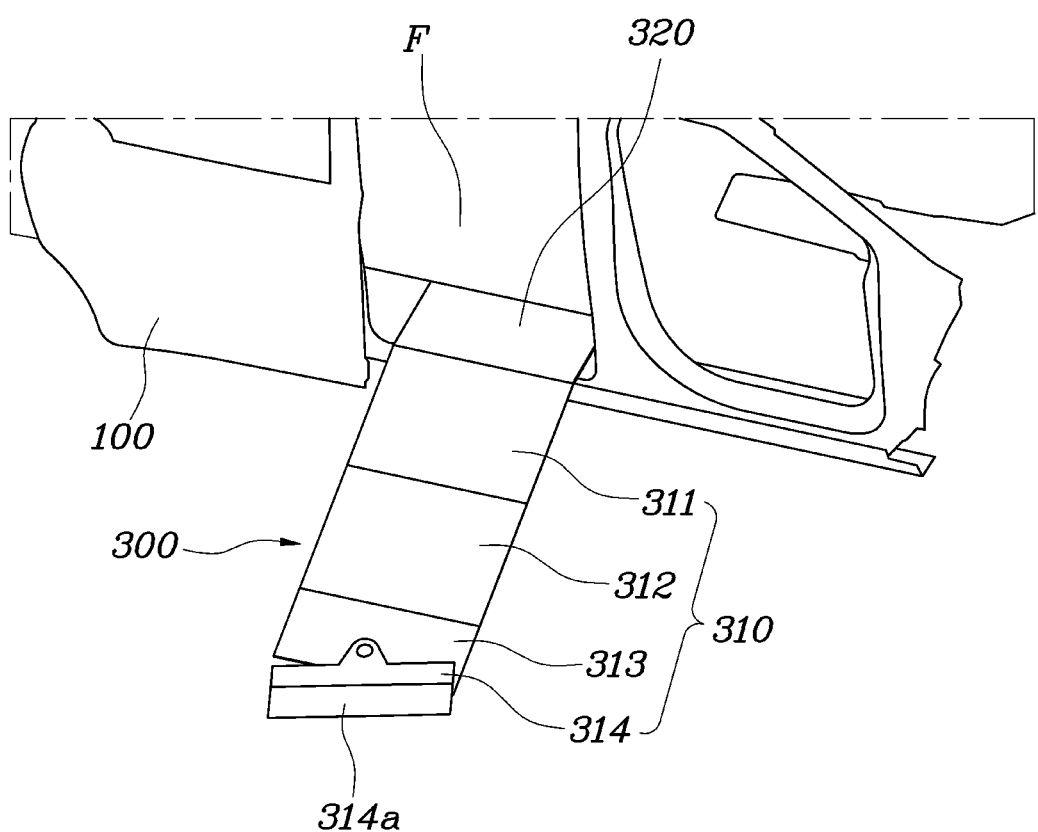
Figure 3:
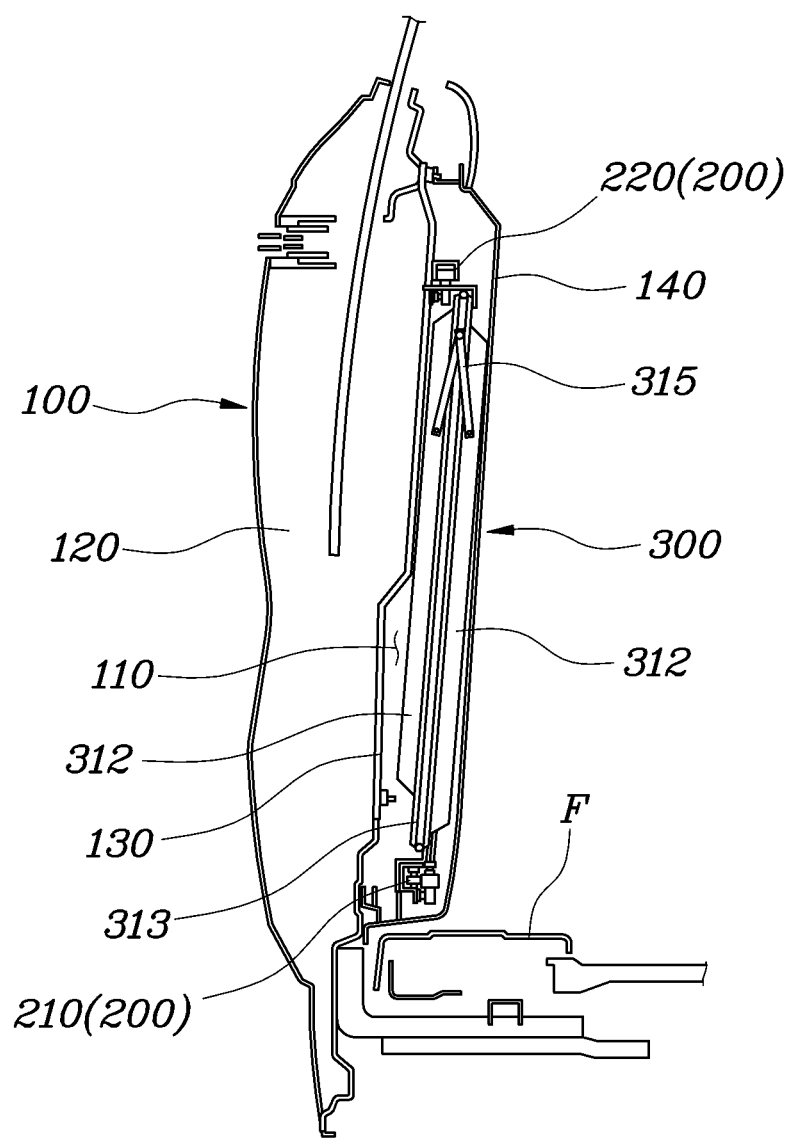
Figure 4:
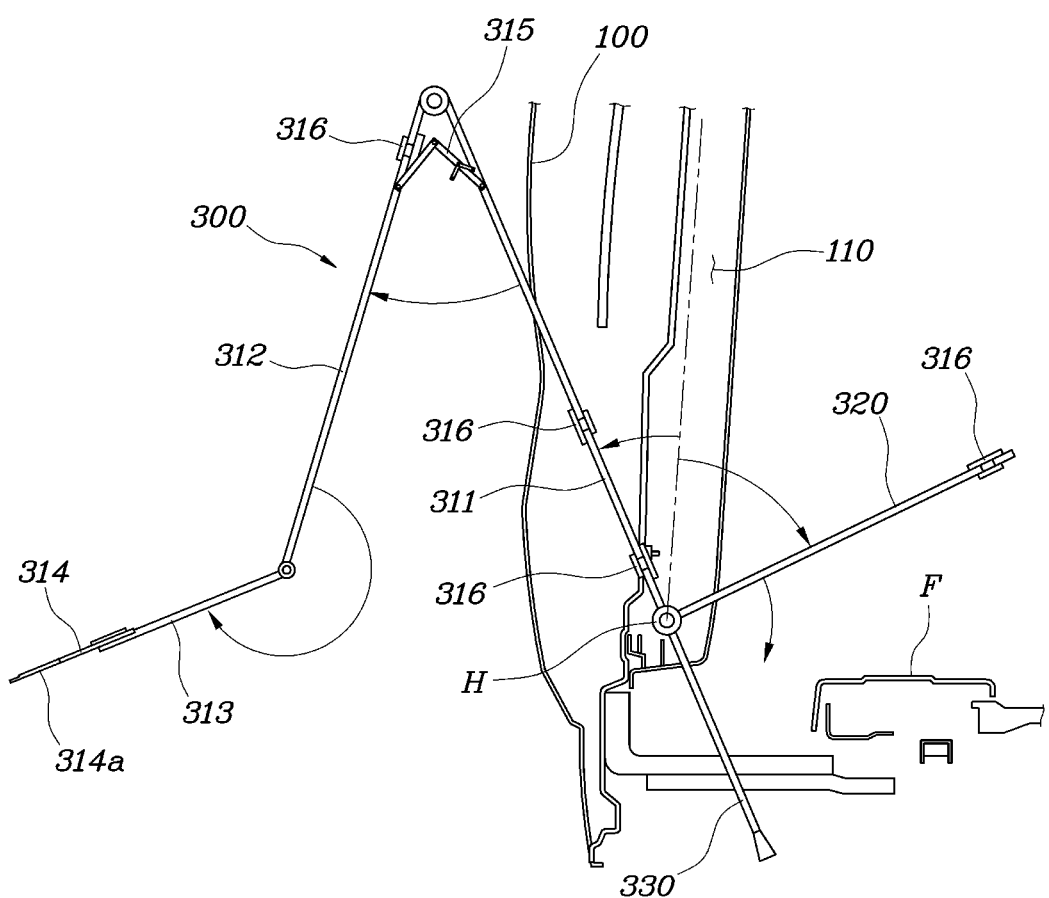
FIG. 4 is a view illustrating an operational state of the ramp apparatus of a door for a vehicle illustrated in FIG. 1.
Figure 5:
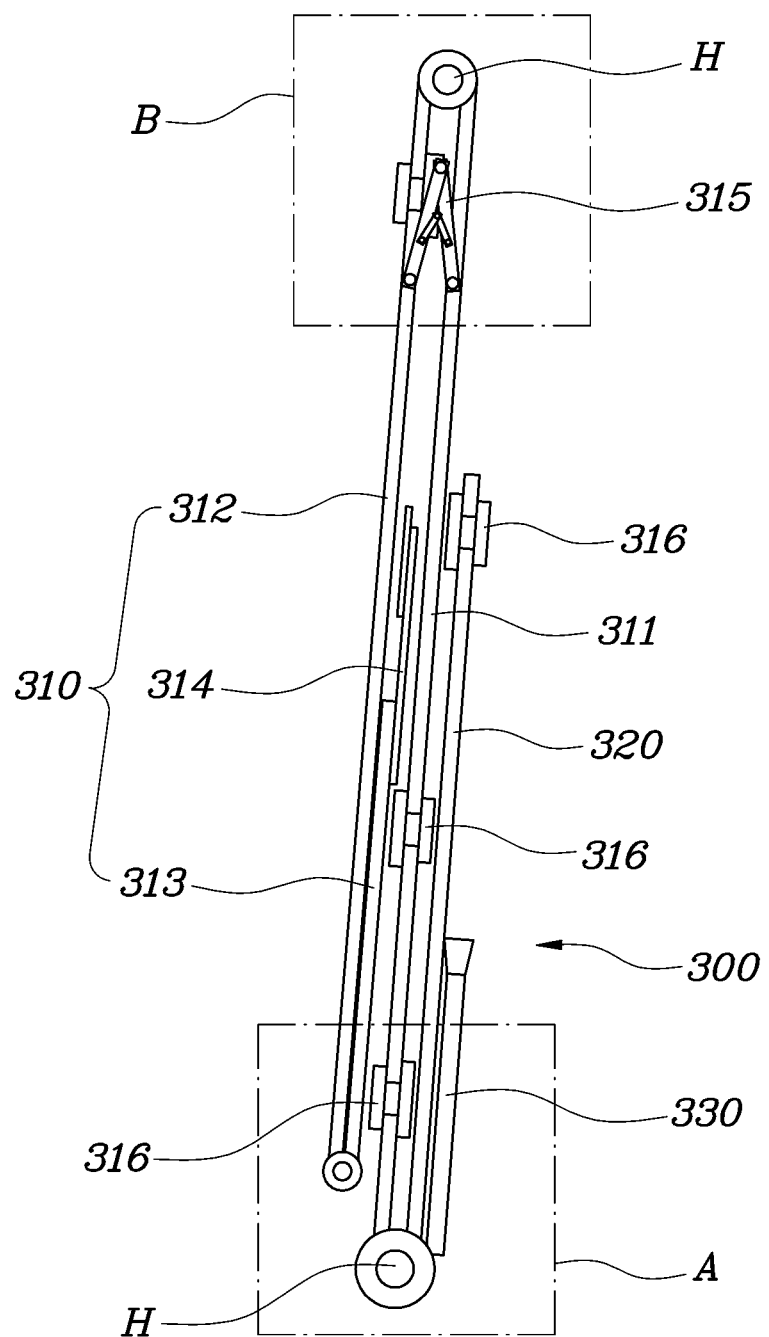
FIG. 5 is a view illustrating a ramp mechanism of embodiments of the present disclosure.
Figure 6:
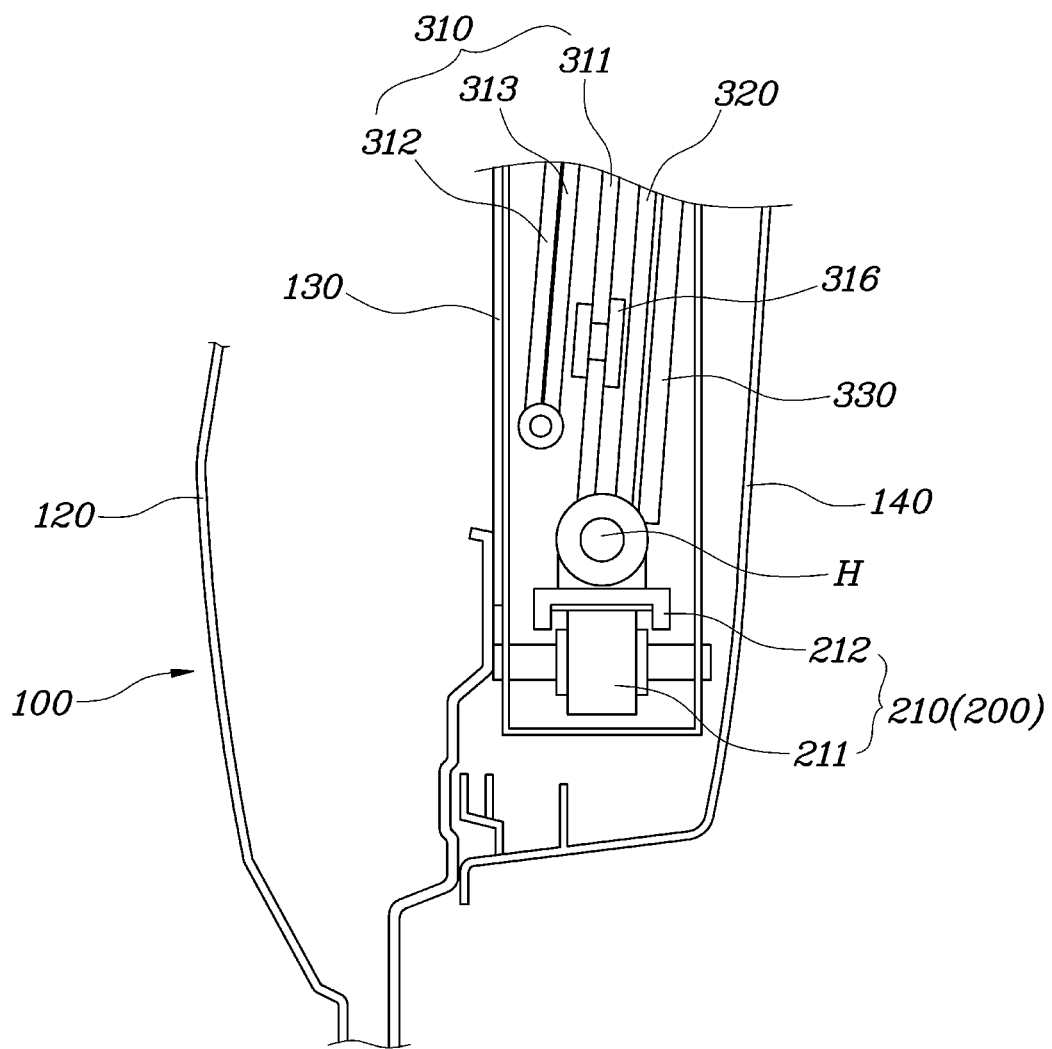
FIG. 6 is a detailed view of region 'A' illustrated in FIG. 5.
Figure 7:
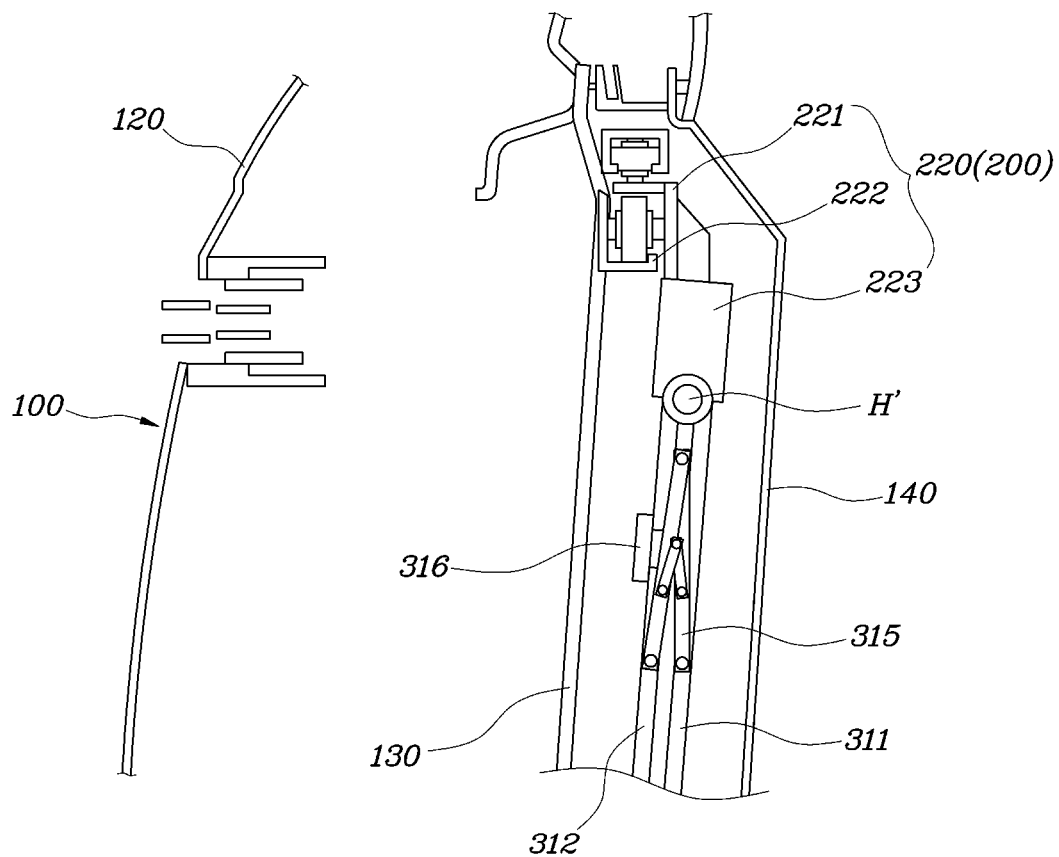
FIG. 7 is a detailed view of region 'B' illustrated in FIG. 5.
Figure 8:
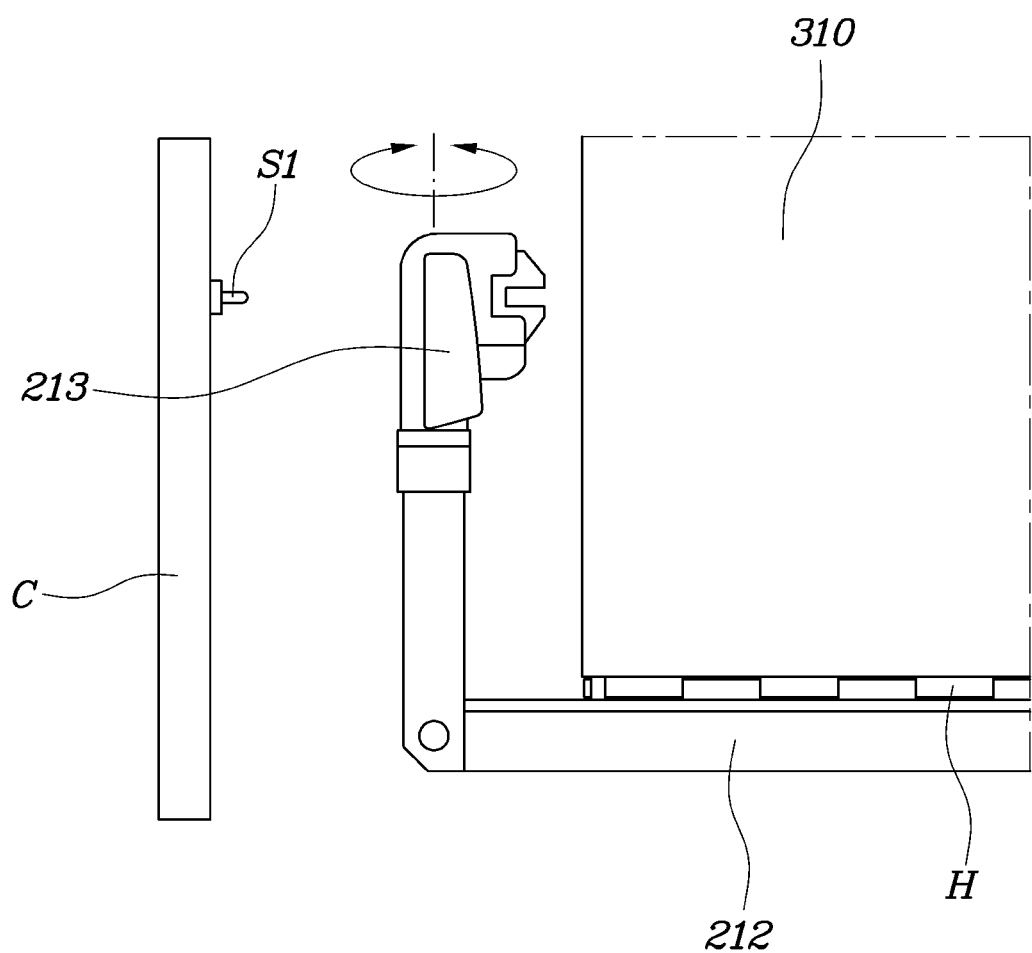
FIGS. 8 to 10 are views illustrating a fixing structure of the ramp mechanism according to embodiments of the present disclosure.
Figure 9:
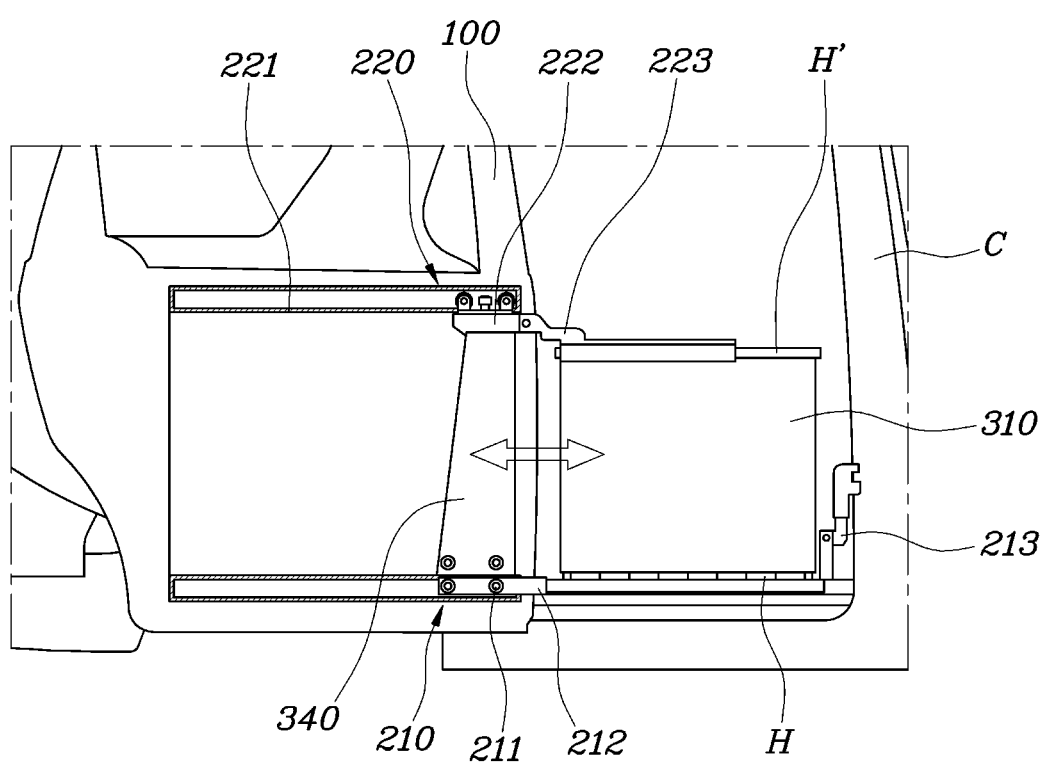
Figure 10:
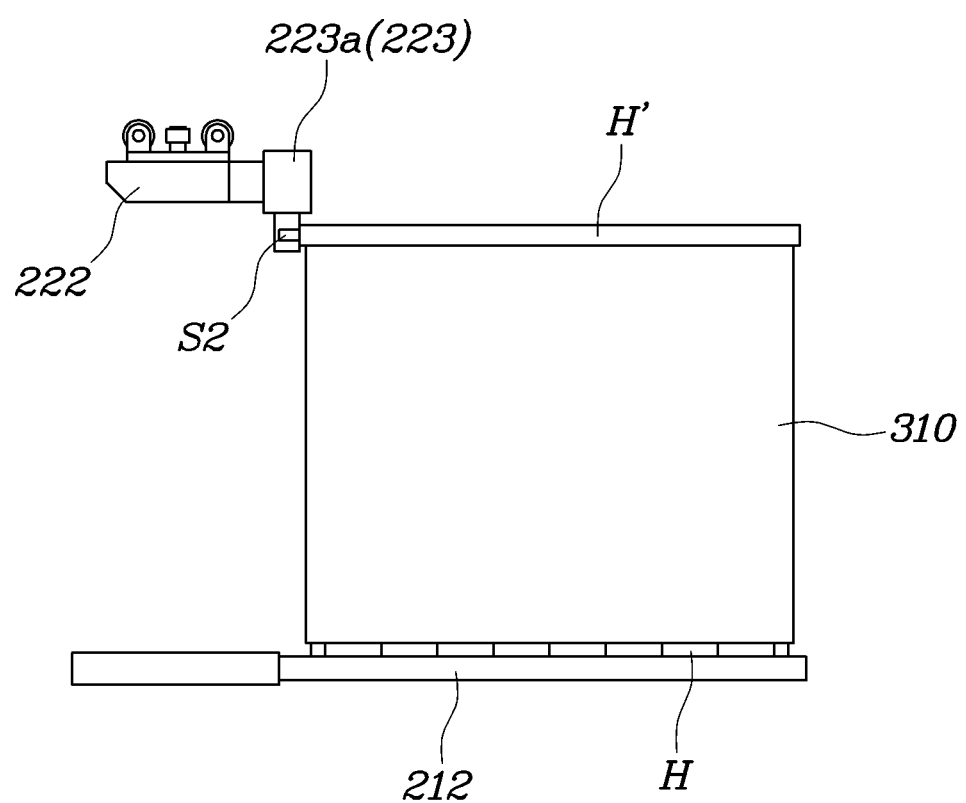

FIGS. 1 to 3 are views illustrating a ramp apparatus of a door for a vehicle according to embodiments of the present disclosure. FIG. 4 is a view illustrating an operational state of the ramp apparatus of a door for a vehicle illustrated in FIG. 1. FIG. 5 is a view illustrating a ramp mechanism of embodiments of the present disclosure. FIG. 6 is a detailed view of region 'A' illustrated in FIG. 5. FIG. 7 is a detailed view of region 'B' illustrated in FIG. 5. FIGS. 8 to 10 are views illustrating a fixing structure of the ramp mechanism according to embodiments of the present disclosure.

A ramp apparatus of a door for a vehicle according to embodiments of the present disclosure, as illustrated in FIGS. 1 to 3, includes a door 100 configured to open and close the interior of the vehicle and having an interior space 110, a guide unit 200 installed in the interior space 110 of the door 100 to be slid to be extracted to the outside of the door 100 or inserted into the door 100, and a ramp mechanism 300 installed in the guide unit 200 to be rotatable and including a plurality of ramp panels 310 connected to each other such that the plurality of ramp panels 310 are rotatable with respect to each other, the plurality of ramp panels 310 being configured to be folded when being located in the interior of the door 100 and to be unfolded when being extracted to the outside of the door 100 by the guide unit 200 to be seated on the ground surface so as to define an inclined route.

In the embodiments of the present disclosure, the ramp mechanism 300 is extracted to the outside of the door 100 through the guide unit 200 and the ramp mechanism 300 includes a plurality of ramp panels 310 such that an inclined route is defined as the plurality of ramp panels 310 are unfolded when being extracted to the outside of the door 100. Accordingly, as can be seen in FIGS. 1 and 2, because the plurality of ramp panels 310 define the inclined route that connects the interior of the vehicle and the ground surface, a wheelchair W can enter the interior of the vehicle over the plurality of ramp panels 310.

In detail, as can be seen from FIG. 3, the door 100 may include an outer panel 120, an inner panel 130, and a door trim 140, and the interior space 110 may be defined between the inner panel 130 and the door trim 140. Because the guide unit 200 is installed in the interior space 110 of the door 100 to be slid and the ramp mechanism 300 including the plurality of ramp panels 310 are installed in the guide unit 200, the ramp mechanism 300 is inserted into the interior space 110 of the door 100 or is extracted to the outside of the door 100 according to whether the ramp mechanism 300 is used. In this way, because the ramp mechanism 300 is extracted from the door 100 according to whether the ramp mechanism 300 is used, it is not exposed to the interior or the exterior when not being used and is deployed to define the inclined route only when being used.

Here, as the plurality of ramp panels 310 are folded when being located in the interior of the door 100, it may be provided in the interior space 110 of the door 100, and as the plurality of ramp panels 310 are unfolded to be seated on the ground surface when being extracted to the outside of the door 100 by the guide unit 200, the inclined route that connects the ground surface and the interior space is defined. Accordingly, a wheelchair or a mini-electric vehicle can enter the interior of the vehicle over the plurality of ramp panels 310.

In a detailed description of the present disclosure, as illustrated in FIG. 2, the door 100 is configured to be slid in the vehicle to open and close the interior of the vehicle, and the interior space 110 is formed to pass through a closing direction of the door 100, and the ramp mechanism 300 can be extracted in the closing direction of the door 100 through the guide unit 200 when the door 100 is located to open the interior of the vehicle.

In this way, because the door 100 is configured to be slid in the vehicle, the ramp mechanism 300 extracted from the interior space 110 of the door 100 may be disposed on an entrance side of the vehicle. Accordingly, because the interior space 110 of the door 100 is formed to pass through the closing direction of the door 100, the ramp mechanism 300 may be extracted in the closing direction of the door 100 to be disposed on the entrance side of the vehicle in a state in which the door 100 is located to open the interior of the vehicle. Accordingly, when the plurality of ramp panels 310 that constitute the ramp mechanism 300 are unfolded, the inclined route that connects the ground surface and the interior of the vehicle is defined such that a wheelchair or a mini-electric vehicle can enter the interior of the vehicle.

In a detailed description of the ramp mechanism 300 according to embodiments of the present disclosure, the ramp mechanism 300 includes a plurality of ramp panels 310, any one of which is installed in the guide unit 200 to be rotatable and the remaining ones of which are connected to each other to be rotatable with respect to each other such that an inclined route is defined as the remaining ones of the plurality of ramp panels 310 are unfolded to the outside of the vehicle when being extracted to the outside of the door 100, and an extension panel 320 installed in the guide unit 200 to be rotatable and configured to be rotated to the interior of the vehicle when being extracted to the outside of the door 100 to define an inclined route together with the ramp panels 310. In the following, hinge structures may be applied to the rotatable connections of the constituent elements.

That is, the ramp mechanism 300 may include the plurality of ramp panels 310 and the extension panel 320, and the plurality of ramp panels 310 define the inclined route outdoors when the ramp mechanism 300 is extracted to the outside of the door 100 and the extension panel 320 may define the inclined route that connects the ground surface and the interior of the vehicle as it defines the inclined route in the interior of the vehicle.

Here, because the ramp panel 310 is installed in the guide unit 200 to be rotatable, it can be located in a state in which it may be received in the interior of the door 100 or rotated to the ground surface, and because the ramp panels 310 are connected to each other to be rotatable, the lengths of the ramp panels 310 are extended when the ramp panels 310 are unfolded and a reception space of the door 100 can be reduced as the ramp panels 310 are folded when being received in the interior of the door 100.

The extension panel 320 is installed in the guide unit 200 to be rotatable and is installed to be rotated to the interior, that is, in an opposite direction of the ramp panels 310, and an inclination is defined in a space between the door 100 and a floor F of the vehicle because the extension panel 320 is formed to extend to be seated on the floor F of the vehicle when the extension panel 320 is rotated to the interior of the vehicle.

In a detailed description of the connection structure of the ramp panel 310, as illustrated in FIGS. 4 to 7, the plurality of ramp panels 310 includes a first ramp panel 311 installed in the guide unit 200 to be rotatable upwards and downwards and a second ramp panel 312 connected to the first ramp panel 311 to be rotatable upwards and downwards, and the first ramp panel 311 is rotated downwards when being extracted to the outside of the door 100 and the second ramp panel 312 is rotated upwards from the first ramp panel 311 to be unfolded.

That is, the first ramp panel 311 is installed in the guide unit 200 to be rotatable upwards and downwards, and may be rotated to the outside of the vehicle together with the remaining ramp panels or be rotated to a location at which the first ramp panel 311 may be received in the interior of the door 100. Because the first ramp panel 311 is connected such that the second ramp panel 312 may be rotated upwards and downwards, the length of the ramp mechanism 300 can be extended as the first ramp panel 311 and the second ramp panel 312 are unfolded when the ramp mechanism 300 is extracted to the outside of the door 100.

A tip end of the first ramp panel 311 may be connected to the guide unit 200 to be rotatable and a tip end of the second ramp panel 312 may be connected to a distal end of the first ramp panel 311 to be rotatable, and because the first ramp panel 311 and the second ramp panel 312 are connected to each other to be rotatable with respect to each other, the first ramp panel 311 and the second ramp panel 312 may be located to overlap each other when the ramp mechanism 300 is not used and the first ramp panel 311 and the second ramp panel 312 may be configured such that the lengths thereof are extended when the ramp mechanism 300 is used.

A support link 315 that is connected to the first ramp panel 311 and the second ramp panel 312 to be rotatable may be further provided. That is, only when the ramp mechanism 300 should maintain a linear state when the first ramp panel 311 and the second ramp panel 312 are rotated to be unfolded as the ramp mechanism 300 is used, a wheelchair or a mini-electric vehicle can easily board the vehicle. Accordingly, because the support link 315 including a plurality of links is connected to the distal end of the first ramp panel 311 and the tip end of the second ramp panel 312, the first ramp panel 311 and the second ramp panel 312 are unfolded by a degree corresponding to a horizontality to form a line as rotation of the first ramp panel 311 and the second ramp panel 312 is restricted by the support link 315 when the first ramp panel 311 and the second ramp panel 312 are unfolded.

Meanwhile, a third ramp panel 313 that is connected to the second ramp panel 312 to be rotatable upwards and downwards to be seated on the ground surface when the third ramp panel 313 is extracted to the outside of the door 100 may be further provided.

Because the third ramp panel 313 is seated on the ground surface while the length thereof is extended together with the second ramp panel 312, the inclined route defined by the ramp panels is connected to the ground surface. Accordingly, because the third ramp panel 313 is connected to be freely rotatable upwards and downwards with respect to the second ramp panel 312, the inclined route that extends to the first ramp panel 311 and the second ramp panel 312 in correspondence to the inclination of the ground surface when the third ramp panel 313 is seated on the ground surface may be defined.

Because the third ramp panel 313, as can be seen in FIG. 5, may be provided to be interposed between the first ramp panel 311 and the second ramp panel 312 when the ramp mechanism 300 is not used, the size of the ramp mechanism 300 in a folded state may be reduced when the ramp mechanism 300 is received in the interior of the door 100.

Meanwhile, as can be seen in FIG. 2, a fourth ramp panel 314 that is connected to the third ramp panel 313 to be rotatable horizontally may be further provided, and an elastic body 314a of an elastic material may be provided at a distal end of the fourth ramp panel 314. Accordingly, because the fourth ramp panel 314 is rotated horizontally with respect to the third ramp panel 313 on a gradient ground surface, coming-over of the ramp panels 310 from the ground surface can be minimized when the inclined route is defined by using the ramp panels. Further, because the elastic body 314a is provided at a distal end of the fourth ramp panel 314, the coming-over of the ramp panels 310 from the ground surface can be removed as the elastic body 314a is attached to the ground surface and the fourth ramp panel 314 is attached to the ground surface by the medium of the elastic body 314a whereby a stable seating state can be maintained.

The above-described ramp panel 310 may further include other ramp panels in addition to the first ramp panel 311, the second ramp panel 312, the third ramp panel 313, and the fourth ramp panel 314, and some ramp panels may be excluded according to a design to simplify the structure.

Meanwhile, as illustrated in FIGS. 4 and 5, because a vibration absorbing part 316 including a material that may absorb vibration may be provided in each of the ramp panels 310 and the extension panel 320, the vibration absorbing part 316 may contact the ramp panels 310 and the extension panel 320 when the ramp panels 310 and the extension panel 320 are folded as the ramp mechanism 300 is located in the interior of the door 100. Here, the vibration absorbing part 316 may include a rubber material that may absorb vibration, and because the ramp panels 310 and the extension panel 320 are provided separately, the vibration absorbing parts 316 are located between the ramp panels 310 and the extension panel 320 in a state in which the ramp panels 310 and the extension panel 320 are folded to overlap each other to prevent the ramp panels 310 and the extension panel 320 from contacting each other. In this way, because the vibration absorbing parts 316 elastically support the ramp panels 310 and the extension panel 320, noise due to collision of the panels is prevented.

Meanwhile, the ramp mechanism 300 may further include a support leg 330 installed in the guide unit 200 to be rotatable and configured to be rotated to the lower side of the door 100 when being extracted to the outside of the door 100 to contact the floor F of the vehicle or the ground surface so as to support the ramp mechanism 300.

As illustrated in FIGS. 1 and 4, the support leg 330 is installed in the guide unit 200 to be rotatable, and because the support leg 330 contacts the floor F of the vehicle or the ground surface in a state in which the ramp mechanism 300 is extracted to the outside of the door 100, a support force capable of supporting the ramp mechanism 300 is secured. That is, because the ramp mechanism 300 should support the weight of the wheelchair or the mini-electric vehicle in addition to the weights of the panels, a high support force should be secured. To achieve this, because the ramp mechanism 300 is provided with the support leg 330 installed in the guide unit 200 to be rotatable, a robust support force of the ramp mechanism 300 is secured as the support leg 330 functions as a column with respect to the floor F of the vehicle or the ground surface.

The plurality of ramp panels 310, the extension panel 320, and the support leg 330, which have been described above, may be installed in the guide unit 200 to be rotated with respect to one hinge pin H, and the plurality of ramp panels 310, the extension panel 320, and the support leg 330 can be sequentially mounted on the guide unit 200 from the exterior to the interior of the vehicle. Accordingly, when the ramp mechanism 300 is used, the ramp panels 310 are rotated to the exterior of the vehicle and the extension panel 320 and the support leg 330 are rotated to the interior of the vehicle. Further, the support leg 330 may be supported by the floor F of the vehicle or the ground surface and the extension panel 320 may be supported by the floor F of the vehicle whereby the support leg 330 and the extension panel 320 may define the inclined route together with the ramp panel 310.

Meanwhile, as illustrated in FIGS. 5 to 7, the guide unit 200 includes a lower guide 210 provided on the lower side of the interior space 110 of the door 100 and to which a specific ramp panel 310 of the ramp mechanism 300 is connected to be rotatable, and an upper guide 220 provided on the upper side of the interior space 110 of the door 100 and connected to the ramp mechanism 300 to be detachable.

That is, the guide unit 200 may include the lower guide 210 and the upper guide 220, and the lower guide 210 causes the ramp mechanism 300 to be extracted from or inserted into the interior space 110 of the door 100 and the upper guide 220 guides movement of the ramp mechanism 300 together with the lower guide 210 and regulates movement of the ramp mechanism 300 as well. Here, the specific ramp panel 310 of the ramp mechanism 300 connected to the lower guide 210 may be the above-described first ramp panel 311.

In detail, as illustrated in FIG. 6, the lower guide 210 may include a lower roller 211 installed on the lower side of the interior space 110 of the door 100, and a lower rail 212 extracted from and inserted into the interior space 110 of the door 100 over the lower roller 211 and in which a specific ramp panel 310 of the ramp mechanism is installed to be rotatable.

That is, because the lower rail 212, in which the specific ramp panel 310 of the ramp mechanism 300 is installed to be rotatable, moves on the lower roller 211 provided on the lower side of the interior space 110 of the door 100, the ramp mechanism 300 may be extracted from or inserted into the door 100. Here, the lower rail 212 may be formed to extend along the interior space 110, and because the specific ramp panel 310 of the ramp mechanism 300 is installed to be rotatable, the ramp panels 310 may be rotated toward the ground surface to define the inclined route when the ramp mechanism 300 is extracted from the interior space 110 of the door 100 together with the lower rail 212. Here, the specific ramp panel 310 may be the above-described first ramp panel 311.

Meanwhile, as illustrated in FIGS. 8 and 9, a lower striker S1 located to face an extraction direction of the ramp mechanism 300 is provided in a body C of the vehicle, and a lower latch 213 configured to be selectively mounted on or separated from the lower striker S1 when the ramp mechanism 300 is extracted is provided in the lower rail 212.

Here, the lower striker S1 may be provided in the pillar frame of the body C, and may be located to face the ramp mechanism 300 with respect to a direction in which the ramp mechanism 300 is extracted from the door 100. The lower latch 213 provided in the lower rail 212 may be configured to be locked to or unlocked from the lower striker S1, and may be applied as a typical latch device. The lower latch 213 may be replaced by a hook structure, in addition to a latch structure.

Accordingly, because the lower latch 213 provided in the lower rail 212 is connected and fixed to the lower striker S1 provided in the body C when the ramp mechanism 300 is extracted from the door 100, a support force capable of supporting the ramp mechanism 300 as the lower rail 212 is connected to the body C is generated. Accordingly, the ramp mechanism 300 can stably support the wheelchair or the mini-electric vehicle through the guide unit 200.

Meanwhile, the lower latch 213 is configured to be rotatable horizontally, and may be rotated in correspondence to the extraction or insertion direction of the ramp mechanism 300. Accordingly, because the lower latch 213 is rotated in the extraction direction of the ramp mechanism 300 to be located to face the lower striker S1 when the ramp mechanism 300 is extracted from the door 100, the lower latch 213 may be smoothly connected to the lower striker S1 to be locked. In contrast, if the lower latch 213 is rotated in the extraction direction of the ramp mechanism 300 when the ramp mechanism 300 is inserted into the door 100, the lower latch 213 can be prevented from being exposed from the interior space 110 of the door 100 to the outside.

Moreover, a separate striker also may be provided in the interior space 110 of the door 100, and because the lower latch 213 is connected to the striker in the interior of the door 100 to be locked when the ramp mechanism 300 is inserted into the interior space 110 of the door 100, the location of the ramp mechanism 300 may be fixed in the interior space 110 of the door 100.

Meanwhile, as illustrated in FIG. 7, the upper guide 220 may include an upper rail 221 installed on the upper side of the interior space 110 of the door 100, a slider 222 configured to be slid along the upper rail 221, and a fixing mechanism 223 installed in the slider 222 and selectively connected to or separated from the ramp mechanism 300.

That is, because the slider 222 moves along the upper rail 221 provided on the upper side of the interior space 110 of the door 100 and the slider 222 is provided with the fixing mechanism 223 that is connected to or separated from the ramp mechanism 300, the ramp mechanism 300 can be extracted to the outside of the door 100 when the slider 222 is slid to the outside of the door 100 in a state in which the ramp mechanism 300 is connected to the fixing mechanism 223.

Here, the upper rail 221 may be formed to extend along the interior space 110 of the door 100, and the fixing mechanism 223 may be selectively connected to a part of the ramp mechanism 300, in which the ramp panels 310 are connected. That is, a hinge part H' is provided in the parts of the above-described ramp panels 310, in which the first ramp panel 311 and the second ramp panel 312 are connected to be rotatable, and because the fixing mechanism 223 contacts the first ramp panel 311 and the second ramp panel 312 connected to the hinge unit H', the ramp mechanism 300 may move along the slider 222 together with the fixing mechanism 223. Here, the fixing mechanism 223 may be formed to surround the hinge part H', to which the first ramp panel 311 and the second ramp panel 312 are connected, and may be rotated upwards and downwards to be connected to or separated from the ramp mechanism 300.

Accordingly, the ramp mechanism 300 may be inserted into or extracted from the interior space 110 of the door 100 in a state in which the fixing mechanism 223 is connected to the ramp mechanism 300, and if the fixing mechanism 223 is separated from the ramp mechanism 300 in a state in which the ramp mechanism 300 is extracted to the outside of the door 100, the panels of the ramp mechanism 300 define the inclined route as the panels are rotated toward the outside or the interior of the vehicle.

It is preferable that the lower rail 212 and the slider 222, which have been described above, are connected to each other through the connection member 340 to move together.

As an embodiment of the above-described fixing mechanism 223, because the fixing mechanism 223 is installed in the slider 222 to be rotatable upwards and downwards and is formed to be stopped by the ramp mechanism 300, the ramp mechanism 300 is connected to the fixing mechanism 223 to be stopped to restrict the rotation of the ramp mechanism 300 when being rotated downwards and the fixing mechanism 223 is separated from the ramp mechanism 300 to allow the rotation of the ramp mechanism 300 when being rotated upwards.

As illustrated in FIG. 9, the fixing mechanism 223 may be selectively connected to or separated from the ramp mechanism 300 when being rotated upwards and downwards with respect to the slider 222. The fixing mechanism 223 may be formed to surround the hinge part H', to which the first ramp panel 311 and the second ramp panel 312 are connected, in the ramp mechanism 300. Accordingly, the ramp mechanism 300 may be inserted into or extracted from the interior space 110 of the door 100 in a state in which the fixing mechanism 223 is connected to the ramp mechanism 300, and if the fixing mechanism 223 is separated from the ramp mechanism 300 in a state in which the ramp mechanism 300 is extracted to the outside of the door 100, the panels of the ramp mechanism 300 define the inclined route as the panels are rotated toward the outside or the interior of the vehicle.

Meanwhile, as another embodiment of the fixing mechanism 223, as illustrated in FIG. 10, the fixing mechanism 223 may include an upper latch 223a that is selectively connected or separated, and the ramp mechanism 300 may include an upper striker S2 that is locked to the upper latch 223a to be fixed in a state in which the ramp mechanism 300 is extracted to the outside of the door 100.

Here, the upper latch 223a that is the fixing mechanism 223 may be configured to be locked to or unlocked from the upper striker S2, and may be applied as a typical latch device. The upper latch 223a may be replaced by a hook structure, in addition to a latch structure.

The upper striker S2 may be provided in the ramp mechanism 300, and in detail, may be provided at an end of the hinge part H', to which the first ramp panel 311 and the second ramp panel 312 are connected. Accordingly, the ramp mechanism 300 may be inserted into or extracted from the door 100 in a state in which the upper latch 223a that is the fixing mechanism 223 is connected to the upper striker S2 provided in the ramp mechanism 300, and if the upper latch 223a is unlocked from the ramp mechanism 300 in a state in which the ramp mechanism 300 is extracted to the outside of the door 100, the panels of the ramp mechanism 300 define the inclined route as the panels are rotated toward the outside or the interior of the vehicle.

According to the ramp apparatus of a door 100 for a vehicle including the above-described structure, because the ramp mechanism 300 is embedded in the door 100, the ramp mechanism 300 is prevented from being exposed to the outside of the vehicle, and thus an interior space of the vehicle is secured and an external design of the vehicle is maintained. Further, according to the ramp mechanism 300, because the inclined route is defined as the ramp mechanism 300 is unfolded after being extracted from the door 100 of the vehicle, convenience of use thereof is improved, the inclined route is prevented from shaking due to the robust support structure, and the durability thereof is improved.

Therefore, the disclosed embodiments of the present disclosure do not limit the technical spirit of the present disclosure but are illustrative, and the scope of the technical spirit of the present disclosure is not limited by the embodiments of the present disclosure. The scope of the present disclosure should be construed by the claims, and it will be understood that all the technical spirits within the equivalent range fall within the scope of the present disclosure.

What is claimed is:

1. A ramp apparatus comprising:
   a door configured to open and close an interior of a vehicle, the door having an interior space, wherein the door is configured to be slid in the vehicle to open and close the interior of the vehicle and the interior space is formed to pass through a closing direction of the door;
   a guide unit installed in the interior space of the door, wherein the guide unit is configured to be slid to be extracted to an outside of the door or to be inserted into the door; and
   a ramp mechanism installed in the guide unit, wherein the ramp mechanism is configured to be rotatable, the ramp mechanism comprising a plurality of ramp panels connected to each other and rotatable with respect to each other, wherein the ramp panels are configured to be folded when being located in the interior of the door and to be unfolded when being extracted to the outside of the door by the guide unit, wherein one of the plurality of ramp panels is configured to be seated on a ground surface when the ramp panels are unfolded so as to define an inclined route, and wherein when the door is located to open the interior of the vehicle, the ramp mechanism is extracted through the guide unit in the closing direction of the door.

2. A ramp apparatus comprising:
   a door configured to open and close an interior of a vehicle, the door having an interior space;
   a guide unit installed in the interior space of the door, wherein the guide unit is configured to be slid to be extracted to an outside of the door or to be inserted into the door, wherein the guide unit comprises a lower guide provided on a lower side of the interior space of the door and an upper guide provided on an upper side of the interior space of the door; and
   a ramp mechanism installed in the guide unit, wherein the ramp mechanism is configured to be rotatable, the ramp mechanism comprising a plurality of ramp panels connected to each other and rotatable with respect to each other, wherein the ramp panels are configured to be folded when being located in the interior of the door and to be unfolded when being extracted to the outside of the door by the guide unit, wherein one of the plurality of ramp panels is configured to be seated on a ground surface when the ramp panels are unfolded so as to define an inclined route, wherein one of the plurality of ramp panels is connected to the lower guide and wherein the upper guide is connected to the ramp mechanism and is configured to be detachable.

3. The ramp apparatus of claim 1, wherein one of the plurality of ramp panels is installed in the guide unit and remaining ones of the plurality of ramp panels are connected to each other and rotatable with respect to each other such that the inclined route is defined when the remaining ones of the plurality of ramp panels are unfolded to the outside of the door, wherein the ramp apparatus further comprises:
   an extension panel installed in the guide unit, wherein the extension panel is configured to be rotated to the interior of the vehicle when being extracted to the outside of the door to define the inclined route together with the ramp panels.

4. The ramp apparatus of claim 3, wherein the plurality of ramp panels comprises:
   a first ramp panel installed in the guide unit and configured to be rotatable upwards and downwards; and
   a second ramp panel connected to the first ramp panel, the second ramp panel configured to be rotatable upwards and downwards, wherein the first ramp panel is configured to be rotated downwards when being extracted to the outside of the door and the second ramp panel is configured to be rotated upwards from the first ramp panel to be unfolded.

5. The ramp apparatus of claim 4, wherein the ramp mechanism further comprises:
   a support link connected to the first ramp panel and the second ramp panel, wherein the support link is configured to connect the first ramp panel and the second ramp panel such that the first ramp panel and the second ramp panel are horizontal when the first ramp panel and the second ramp panel are rotated to be unfolded.

6. The ramp apparatus of claim 4, further comprising a third ramp panel connected to the second ramp panel, wherein the third ramp panel is configured to be rotatable upwards and downwards and is configured to be seated on the ground surface when the plurality of ramp panels are unfolded.

7. The ramp apparatus of claim 6, further comprising:
   a fourth ramp panel connected to the third ramp panel, wherein the fourth ramp panel is configured to be rotated horizontally; and
   an elastic body of an elastic material provided at a distal end of the fourth ramp panel.

8. The ramp apparatus of claim 3, wherein a vibration absorbing part comprising a material that is capable of absorbing vibration is provided in each of the ramp panels and the extension panel, wherein the vibration absorbing parts are configured to contact the ramp panels and the extension panel when the ramp panels and the extension panel are folded as the ramp mechanism is located in the interior of the door.

9. The ramp apparatus of claim 3, wherein the extension panel is configured to be seated on a floor of the vehicle when being rotated to the interior of the vehicle.

10. The ramp apparatus of claim 1, further comprising a support leg installed in the guide unit, wherein the support leg is configured to be rotated to a lower side of the door when being extracted to the outside of the door to contact a floor of the vehicle or the ground surface to support the ramp mechanism.

11. The ramp apparatus of claim 1, wherein the ramp mechanism comprises the plurality of ramp panels, an extension panel, and a support leg, and wherein the plurality of ramp panels, the extension panel, and the support leg are configured to rotate with respect to a hinge pin in the guide unit.

12. The ramp apparatus of claim 2, wherein:
the door is configured to be slid in the vehicle to open and close the interior of the vehicle and the interior space is formed to pass through a closing direction of the door; and when the door is located to open the interior of the vehicle, the ramp mechanism is extracted through the guide unit in the closing direction of the door.

13. The ramp apparatus of claim 2, wherein the lower guide comprises:
a lower roller installed on the lower side of the interior space of the door; and
a lower rail configured to be extracted from and inserted into the interior space of the door over the lower roller.

14. The ramp apparatus of claim 13, further comprising:
a lower striker provided in a body of the vehicle and located to face an extraction direction of the ramp mechanism; and
a lower latch provided in the lower rail and configured to be selectively mounted on or separated from the lower striker when the ramp mechanism is extracted.

15. The ramp apparatus of claim 14, wherein the lower latch is configured to be rotatable horizontally and is configured to rotate in correspondence to an extraction or insertion direction of the ramp mechanism.

16. The ramp apparatus of claim 2, wherein the upper guide comprises:
an upper rail installed on the upper side of the interior space of the door;
a slider configured to be slid along the upper rail; and
a fixing mechanism installed in the slider and selectively connected to or separated from the ramp mechanism.

17. The ramp apparatus of claim 16, wherein the fixing mechanism is configured to be rotatable upwards and downwards from the slider and is configured to be stopped by the ramp mechanism.

18. The ramp apparatus of claim 17, wherein the ramp mechanism is configured to be connected to the fixing mechanism to be stopped when the fixing mechanism is rotated downwards to restrict rotation of the ramp mechanism, and wherein the fixing mechanism is configured to be separated from the ramp mechanism when the fixing mechanism is rotated upwards to allow rotation of the ramp mechanism.

19. The ramp apparatus of claim 16, further comprising:
an upper latch in the fixing mechanism that is selectively connected or separated; and
an upper striker in the ramp mechanism that is configured to be locked by the upper latch to be fixed in a state in which the upper striker is extracted to the outside of the door.

20. A vehicle comprising:
a door configured to open and close an interior of the vehicle, the door having an interior space, wherein the door is configured to be slid in the vehicle to open and close the interior of the vehicle and the interior space is formed to pass through a closing direction of the door;
a guide unit installed in the interior space of the door, wherein the guide unit is configured to be slid to be extracted to an outside of the door or to be inserted into the door; and
a ramp mechanism installed in the guide unit, wherein the ramp mechanism comprises multiple ramp panels connected to each other and rotatable with respect to each other, wherein the ramp panels are configured to be folded when being stored in the interior of the door and are configured to be unfolded when being extracted to the outside of the door and wherein when the door is located to open the interior of the vehicle, the ramp mechanism is extracted through the guide unit in the closing direction of the door.

* * * * *